D. D. Baker,
Swinging Gate.
N° 66,113. Patented June 25, 1867.
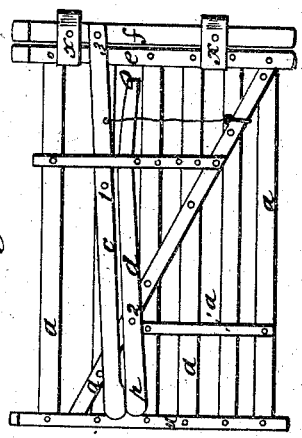
Witnesses.
H P K Peck
Gus Hill
Inventor.
David D Baker
By his Atty
H. P. K. Peck.

United States Patent Office.

DAVID D. BAKER, OF WEST ALEXANDRIA, OHIO.

Letters Patent No. 66,113, dated June 25, 1867.

GATES.

*The Schedule referred to in these Letters Patent and making part of the same.*

TO ALL WHOM IT MAY CONCERN:

Be it known that I, DAVID D. BAKER, of West Alexandria, in Preble county, in the State of Ohio, have invented a new and useful improvement in Gates; and I do hereby declare that the following is a full and exact description thereof, reference being had to the accompanying drawings, and to the letters of reference marked thereon.

Figure 1 is a side elevation of my improved gate, and

Figure 2 represents a sectional view of the gate-posts and clasp-hinge.

The object of my invention is to furnish such a construction of gates that the same may be elevated with ease and facility to pass over obstructions; and my invention consists in the arrangement and combination of levers with posts and clasp-hinges operating as will be hereinafter set forth for that purpose.

In the drawings, $a\ a$ denote the gate, which may be constructed in the usual manner. The strip $i$ is so fastened to the side of the gate as to form a slot, through which the levers $c$ and $d$ extend. The lever $d$ is pivoted at 2 to the gate, and the lever $c$ is in like manner pivoted at 1. Lever $c$ is likewise pivoted at 3 to the hinge-post $f$. The hinges $x\ x$ are secured in the usual manner to post $f$, and extend in front of the post $e$, where they are bent at right angles to form a clasp, embracing the post $e$, as represented in fig. 2. The gate is connected to post $f$ by means of the clasps of the hinges $x\ x$, and by the pivot 3 connecting the lever $c$ with post $f$. The loops of the hinges, seen at $m$ in fig. 2, serve to hang the gate upon a fixed post, set in the ground in the usual manner. The bar $i$ is provided with a number of holes for the insertion of a pin above the handle $o$ of lever $d$ to retain the gate at any desired elevation.

When the ground is raised by frost, or the gate is obstructed by snow, it is desirable to raise the gate so that it will swing freely over the obstructions. To effect this operation the lever $d$ will be depressed, and, as it turns upon its pivot 2, its rounded end $p$ will bear against the end of lever $c$, which will turn upon its pivot 1, and, as lever $c$ is connected by pivot 3 to the hinge-post $f$, the gate will be elevated, causing the part $e$ to slide within the clasps formed on the bent hinges $x\ x$.

From the foregoing description it will be understood that the gate may be raised and lowered with great ease, without in any manner affecting the operation of the hinges upon which it is opened and closed.

Having fully described my improvement in gates, what I claim, and desire to secure by Letters Patent, is—

The combination and arrangement of the levers $c\ d$, posts $e\ f$, clasp-hinges $x\ x$, and slot-bar $i$, when constructed, arranged, and operating conjointly in the manner described for the purpose specified.

In testimony whereof I have hereunto set my hand this 18th April, 1867.

DAVID D. BAKER.

Witnesses:
 H. P. K. PECK.
 A. L. PECK.